Figure 1:
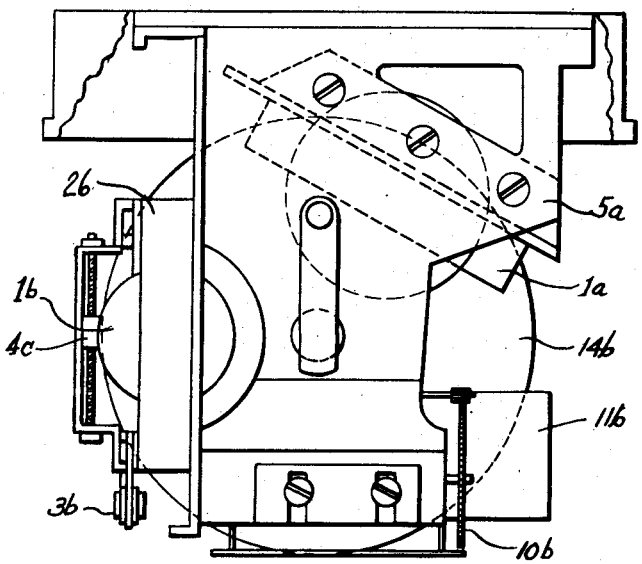

July 14, 1953

C. R. LOPEZ 2,645,757

ELECTRIC ENERGY METER

Filed April 8, 1949

5 Sheets-Sheet 1

INVENTOR.
CARLOS ROMANILLOS LOPEZ

BY *Richard J. Geier*

ATTORNEYS

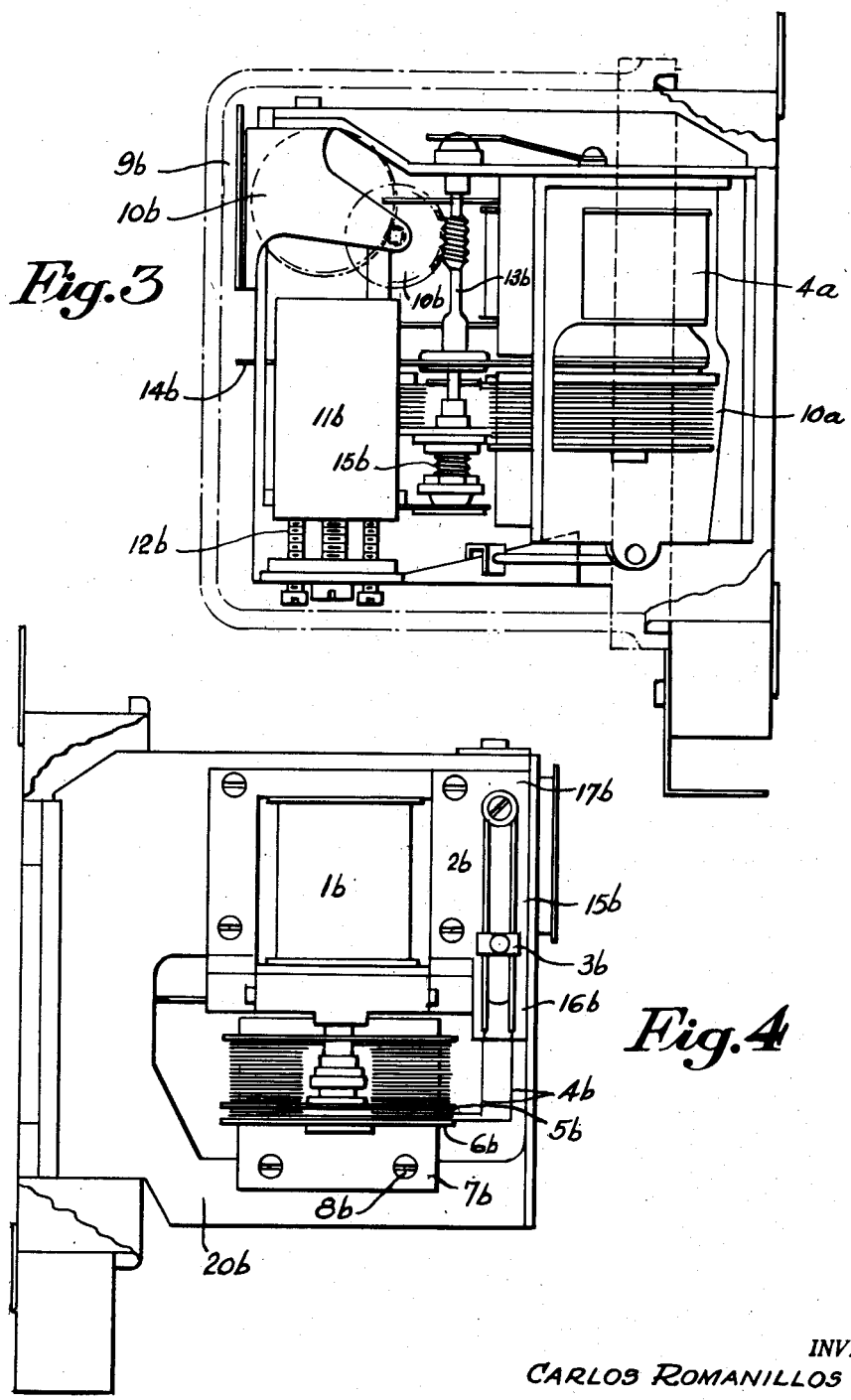

July 14, 1953 C. R. LOPEZ 2,645,757
ELECTRIC ENERGY METER
Filed April 8, 1949 5 Sheets-Sheet 3
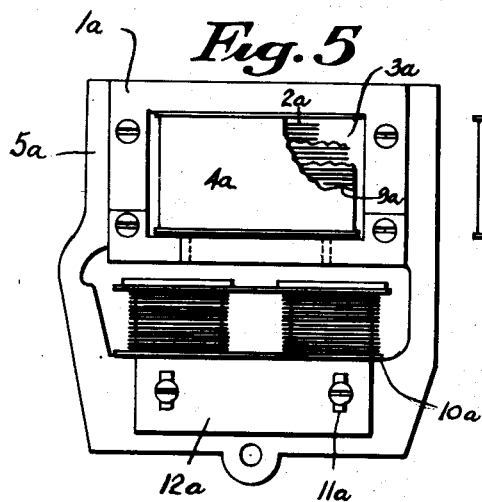
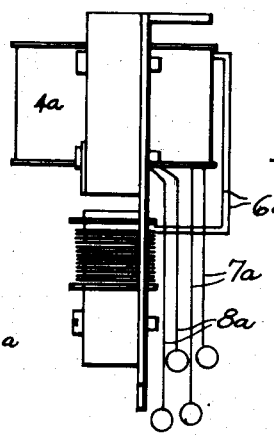
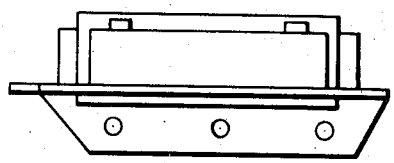
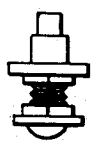
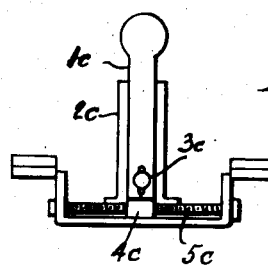
INVENTOR.
CARLOS ROMANILLOS LOPEZ
BY
ATTORNEYS July 14, 1953

C. R. LOPEZ 2,645,757

ELECTRIC ENERGY METER

Filed April 8, 1949

5 Sheets-Sheet 4

INVENTOR.
CARLOS ROMANILLOS LOPEZ
BY
ATTORNEYS

July 14, 1953 — C. R. LOPEZ — 2,645,757
ELECTRIC ENERGY METER
Filed April 8, 1949 — 5 Sheets-Sheet 5

INVENTOR.
CARLOS ROMANILLOS LOPEZ
BY
ATTORNEYS

Patented July 14, 1953

2,645,757

UNITED STATES PATENT OFFICE 2,645,757

ELECTRIC ENERGY METER

Carlos Romanillos López, Leon, Spain

Application April 8, 1949, Serial No. 86,130
In Spain July 13, 1948

1 Claim. (Cl. 324—107)

This invention relates to electric energy meters and more particularly to a method and means for preventing the fraudulent use of electrical energy from a watt hour meter.

From information gained in innumerable cases of fraudulent use of electric energy it has been concluded that a number of the users of electrical energy through a meter commit fraud in various ways by causing abnormal functioning of the meter, due to the vulnerability of the existing meters on the market. The counter-measures which have been carried out by electric supply companies have proved fruitless, such as the complete encasing of the meter terminal covers, and protection of the lines by means of lead or Bergman tube. Likewise prosecution and punishment for these crimes have proved fruitless and they continue to increase in popularity due to the simplicity with which they may be carried out.

Some of the known methods of fraud are as follows:

1. Fraud by the introduction of a wire through the meter casing in order to immobilise the revolving disc.

2. Reversing the phases or phase and neutral in the meter and connecting to earth by means of the water piping and taking-out previously the neutral fuse and consequently de-energizing the current coil. The criminal in many cases leaves some lamps in circuit with the meter so as to give some reading on the meter in order to deceive the person who takes the reading.

3. Other criminals use current fraudulently by making the disc turn in the reverse direction, thus discounting the total measured energy, by reversing the phases of the meter in such a way that the neutral passes through the current coil, and installing a small transformer branched to the earth commonly called "the crab"; which succeeds in effecting a phase difference of 180° between the current in the current coil and the voltage so that the disc turns in the reverse direction, discounting energy indicated.

The first mentioned type of fraud may be prevented by using a glass cover which prevents perforation of the casing, but with the present known types of meters there is no way of preventing the second and third types of fraud above-mentioned.

Consequently, applicant has carried out a study to try and find a new type of meter which does not allow the criminal consumer to carry out the above fraudulent methods. An object of the present invention is to provide an energy meter which, in addition to having a current and voltage device for the revolving field, is provided also with another inductive device capable of producing a revolving field which moves the disc proportionally to the current used and is adapted to function in the case of fraudulent use already mentioned. That is to say, the meter continues to function when it is attempted to put the first-mentioned device out of order, and comes into effect when the normal functioning of the said revolving field of the main device fails.

Figure 2:
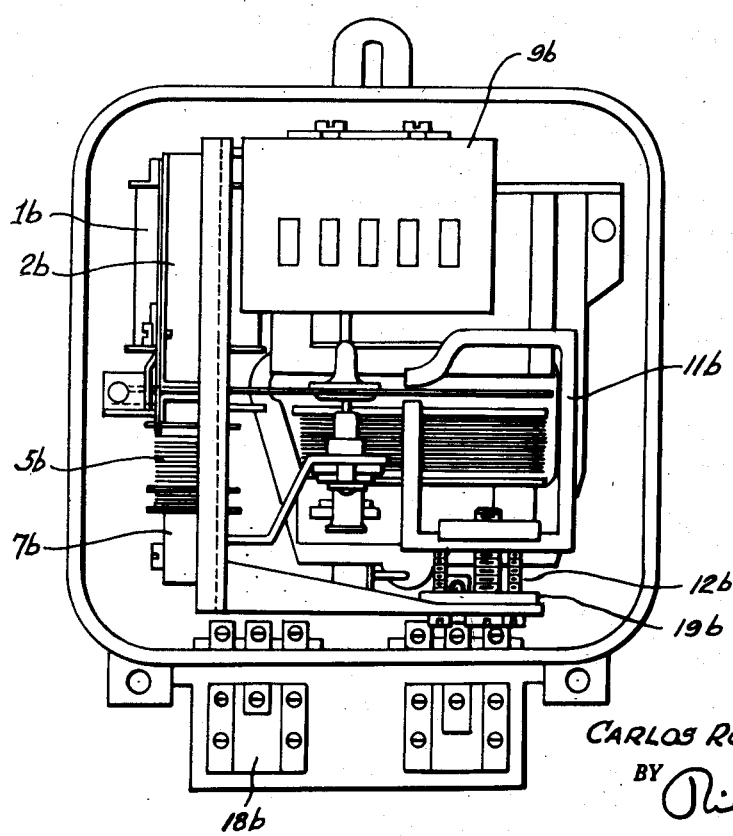
Figure 10:
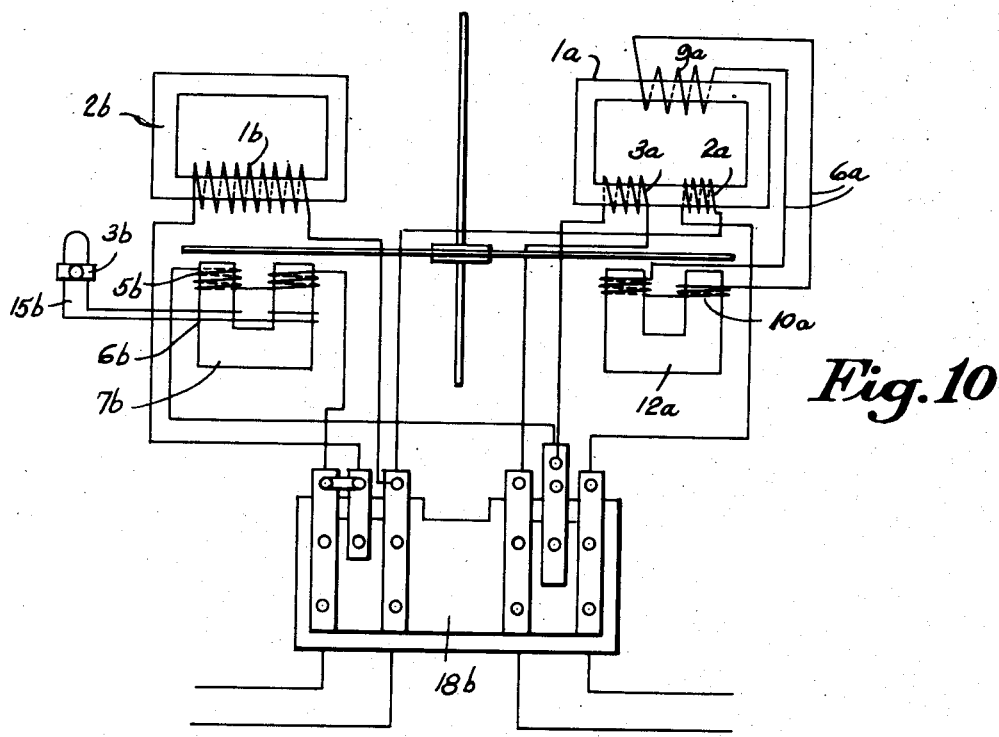
Figure 11:
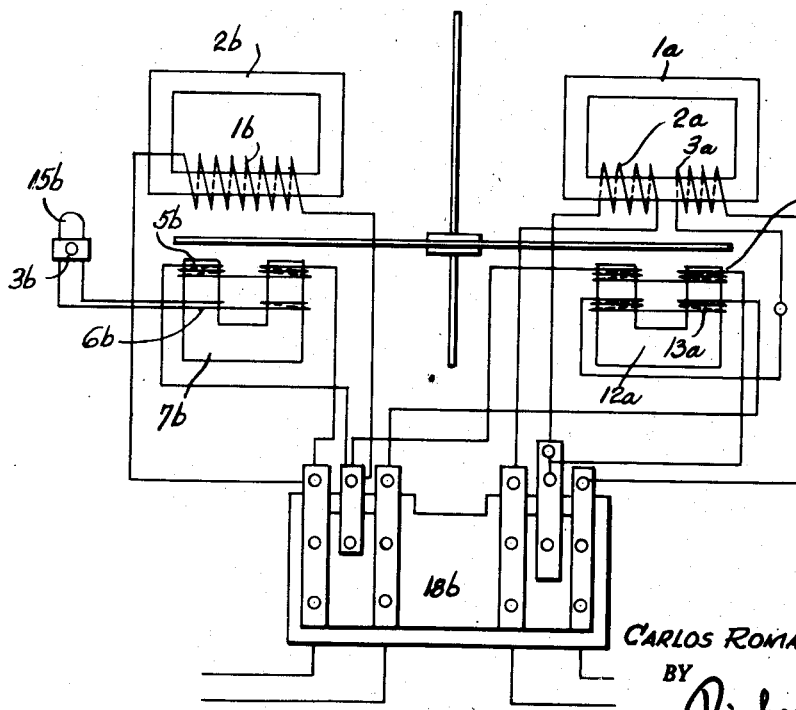
Figure 12:
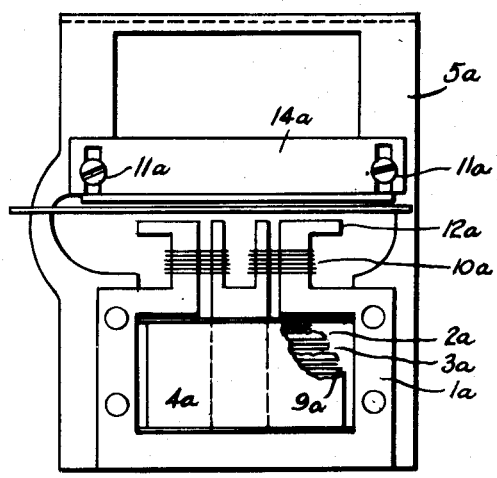
Figure 13:
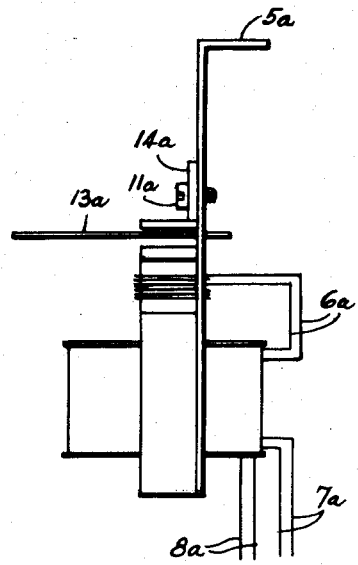
Figure 14:
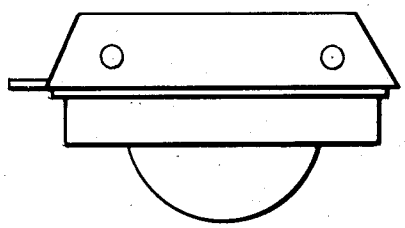

Embodiments of the invention will now be described, by way of example, with reference to the accompanying drawings in which:

Fig. 1 is a plan view of the meter, Fig. 2 is a front view, Fig. 3 a side elevation viewed from the side A in Fig. 1. Fig. 4 is a view seen from the side B of Fig. 1 of the usual voltage and current device, Fig. 5 is a front view of the inductive device, Figs. 6 and 7 are respectively side and inverted plan views corresponding to Fig. 5, Fig. 8 shows a regulating device, Fig. 9 shows the lower bearing for the disc, Fig. 10 shows diagrammatically the circuit, Fig. 11 shows diagrammatically an alternative circuit, and Figs. 12, 13 and 14 show an alternative embodiment in front, side and plan views respectively.

Referring to the drawings, the normal functioning device of the revolving field meter consists of a voltage coil 1-B connected between phases or between phase and neutral and mounted on an enclosed core of three parts, on whose lower part there are two small gaps between metallic surfaces. This coil produces a phase difference of 90° between the applied voltage and the induced voltage, as a result of a great coefficient of self-induction. In Fig. 4 is shown an electro-magnet 7-B placed below the coil 1-B which has a certain number of windings 5-B carrying the main current. The correction of phase difference between the induced voltage and the applied voltage, that is to say between the field produced by the current which flows through the voltage coil 1-B and the field produced by the current coil 5-B, is brought about by windings 6-B wound in the opposite direction to those of the current coil and which are short-circuited by a bridge of nickeline wire; the current which circulates through the windings in closed circuit being able to be increased or decreased by means of a slide 3-B, in such a way that the flux which this current produces gives a resultant from the field with the applied voltage having a phase difference of 90° with relation to the induced voltage.

The regulation of this device for small loads is effected by means of a part shown in Fig. 8 which consists of a U-shaped fork which is attached to the core of the voltage coil by screws, and through the medium of a screw 5-C moves, in one direction or the other, a prismatic part which in its lower part is supported on a small wedge or tongue which can rotate by means of the rivet 3-C sliding on 2-C which corresponds to a doubled plate and projecting from the said fork of this device. Therefore, as this mobile wedge is placed in the gap between the branches of the electro-magnet underneath the disc and consequently under the two gaps in the core of the voltage coil when displaced describes an arc of a circle through the medium of the screw 5-C and closes the magnetic circuit of the voltage coil which is displaced in the appropriate direction for regulation.

Referring to Figs. 5, 6, and 7, the inductive device is shown located on a yoke 5-A.

The device consists of an armoured core 1-A formed of three parts having two small gaps between the metallic surfaces in the lower part. In the core there are carried centrally three coils, 2-A, 3-A and 9-A insulated from and independent of one another.

In the lower part of the yoke 5-A there is mounted an electro-magnet 12-A held in position by screws 11-A, the coils connected in series being shown at 10-A. The meter disc revolves in the clerance between the core and the electromagnet. The location of this inductive device in the meter is shown in Figs. 1 and 3.

The coils 2-A and 3-A have an equal number of windings and one of them is connected in series with the current coil 5-B of the normal device, and the other in series with the phase or neutral of the line, and therefore both carry the main current in such a way that the inductance produced in each of these coils when carrying current are of opposite direction, the resultant inductance being equal to zero. On the same core there is a third coil 9-A connected in closed circuit with the two coils 10-A of the electro-magnet 12-A by the conductors 6-A.

As the two coils 2-A and 3-A carrying the main current of both phases or of phase and neutral are equal, and the inductance in the core is zero, consequently in the third coil 9-A no current is induced.

Thus, during the normal functioning of the meter the inductive device, produces no inductive effect on the meter disc which might cause any irregularity in its normal functioning.

The force which drives the disc is formed by the resultant of the field produced by the difference in inductance created by the two coils carrying the main current and the field due to the current induced by these two coils 2-A and 3-A in the coil 9-A which is connected to the coils of the electro magnet 12-A and whose inductance creates a field with a phase difference in the proximity of 90°.

In order to regulate this phase difference definitely, when the meter is being manufactured, it is sufficient that one of the conductors 6-A should have a predetermined resistance.

The force is proportional to the main current in the circuit of the device 5-A and the current induced in the coil in short circuit, therefore it is directly proportional to the difference between the currents of the phases or phase and neutral. Thus, if one tried to suppress the current phase of the normal field of a meter of any present type, the disc would stop but with the present device, when current fails on any of the two induction coils in 5-A, the most that happens is that the other coil remains inactive and the meter continues to function. Then any unbalancing of current between phases or between phase and neutral in the case of attempted fraud causes the inductive device to rotate the disc.

The failure of a phase or neutral in the meter does not prevent the latter from continuing to function proportionally to the current.

If an attempt is made to reverse the phases or phase and neutral by earthing, the meter is affected as above, the revolving fields created being at a maximum since the second current coil does not carry any current.

The force which is produced in the device causes one single direction of rotation in the disc, in view of the fact that if it is attempted to change the direction of the current in the meter it is changed at the same time in the fields or coils 2-A and 3-A and in the induction coils 9-A and 10-A of the electro-magnet. If it is attempted to apply the fraud mentioned above by the system known as "the crab," while in the known meters rotation of the disc would be reversed, with the present device, it would continue to rotate in the normal direction.

As a result of the present invention, fraud is not possible by taking away the current phase of the meter, inversion and earthing, reversing rotation of the disc, and by reversal and earthing by means of a transformer, called "the crab fraud," nor by any other system which attempts to effect a phase difference of 180° between the induced voltage and the applied voltage.

The circuit diagram is shown in Fig. 10.

When the requirements of the meter's capacity so require, modifications may be made in accordance with the circuit diagram shown in Fig. 11, which consists of the same core already mentioned with only the coils modified in it. The two coils 2-A and 3-A of equal number of turns are mounted on the core 1-A. On the electro-magnet 12-A two independent coils insulated from each other are arranged so that one is in series with the current coil 5-B of the normal device and in series also with the coil 2-A on the core 1-A. The other coil 13-A is in series with the coil 3-A of the core 1-A. Both therefore are placed in series with the phases or phase and neutral, their functioning being the same as that of Fig. 10.

The meter is equipped with its magnet brake and consumption totalisator, and these parts are mounted in a box of sheet iron, having a support and painted a grey colour which prevents all attempt to find an open orifice with the object of introducing a foreign body, as imitation of the colour in re-painting is difficult, which is not the case with the black colour which is usually used. The closure of the meter is provided with a glass covering of prismatic form and connected to the box support by means of a metallic frame which is fixed with two screws perforated so as to be sealed.

In Figs. 12, 13 and 14 there is shown a modified embodiment of the inductive device shown in Figs. 5, 6 and 7. The fundamental principle of the coils of said device which produce the revolving field to operate the disc in case of attempted fraud, is the same, and this modification deals with the three coils 2-A, 3-A and 9-A and the coil of the electro-magnet 12-A according to Fig. 5. These are mounted on the same core and the flux produced by the coils 2-A and 3-A and the flux produced by the coil of the electro-magnet 12-A through the current induced in the coil 9-A as a consequence of the unbalancing of consumption between phases or between phase and neutral produce a compound flux which gives rise to a revolving field which moves the disc.

In Fig. 12 is shown the support for the whole inductive device 5-A. On this support there is placed a core 1-A having three parts whose ends are extended outwards in the form of a square 12-A. On the central part of the said core are located the coils 2-A and 3-A independent of and insulated from each other, and both carrying the main current of the circuit formed by the phases or the phase and neutral. Over these two coils and insulated from and independent of them is the third coil 9-A connected in circuit with the coil 10-A which corresponds to the electro-magnet.

The compound flux due to the difference in current consumption between phases or between phase and neutral through the coils 2-A and 3-A, and that of the coil 10-A combine across a rectangular part 14-A which is attached to the support 5-A by means of the screws 11-A. The part 14-A is movable up or down by virtue of elongated orifices to effect increase or decrease of the clearance between the core and the part 14-A into which the disc of the meter penetrates.

The connections of the device are the same as those shown in Figs. 10 and 11, in accordance with the capacity of the meter and the requirements of construction. That is to say, in the case corresponding to Fig. 10 the coils 2-A and 3-A are connected, one in series with the current coil of the meter and the other in series with the other phase or neutral of the circuit, and the coil 9-A is connected in closed circuit with the coil 10-A on the same core 1-A.

In the second case, corresponding to Fig. 11 another coil having the same number of turns as the coil 10-A is mounted on the same branches 12-A of the core 1-A Fig. 12 and the third coil 9-A is omitted so that of the two coils installed on the branches of the core 1-A one is connected in series with the current coil of the normal device 5-B of the meter and in series with the coil 2-A of this new device, and the other coil 2-A of the same number of turns as the coil 10-A mounted on the same branches 12-A is connected in series with the other coil 5-A on the said central core which is connected to the other phase or neutral of the circuit.

The two coils which are mounted on the branches 12-A are connected to the phases or to phase and neutral of the main circuit so that, in the case of equal current consumption in the two phases or phase and neutral, the inductance produced in the core is zero, the same occurring in the connection of the two coils 2-A and 3-A.

In Fig. 13, the interconnection of the coils 10-A and 9-A is shown at 6-A. The input and output connections of the coils 2-A and 3-A are shown at 7-A and 8-A respectively.

I claim:

An inductive device for a two-phase watt hour meter having a disc rotatably mounted intermediate a voltage coil and a current coil; the current coil being connected with one phase and a neutral; the inductive device comprising an electromagnet, a rectangular core disposed adjacent one side of the disc in spaced relationship with the current and voltage coils, a coil disposed on the core adjacent the disc, and means for connecting the last-mentioned coil between the neutral and the phase to which the current coil is connected; the device further comprising a second coil disposed on the core adjacent the first coil and the disc, the second coil having the same number of turns as the first coil, means for connecting the second coil in series with the second phase, and a third coil disposed on the core in spaced relationship with the first and second coils; the device further comprising a second electromagnet disposed on the side of the disc opposite to the first electromagnet, means for connecting together the third mentioned coil and the coil of the second electromagnet, and means for maintaining substantially a 90° lag between any unbalanced current in one of the first two mentioned coils and the current in the coil of the second mentioned electromagnet.

CARLOS ROMANILLOS LÓPEZ.

References Cited in the file of this patent

UNITED STATES PATENTS

| Number | Name | Date |
|---|---|---|
| 1,739,166 | Moss | Dec. 10, 1929 |
| 1,758,673 | Mettler | May 13, 1930 |
| 1,844,531 | Wey et al. | Feb. 9, 1932 |
| 1,993,313 | Wagner II | Mar. 5, 1935 |
| 2,052,733 | Wagner et al. | Sept. 1, 1936 |
| 2,059,743 | Petri | Nov. 3, 1936 |
| 2,167,832 | Fulmer | Aug. 1, 1939 |

FOREIGN PATENTS

| Number | Country | Date |
|---|---|---|
| 373,742 | Germany | Apr. 16, 1923 |
| 208,365 | Great Britain | Dec. 20, 1923 |